United States Patent Office 3,502,227
Patented Mar. 24, 1970

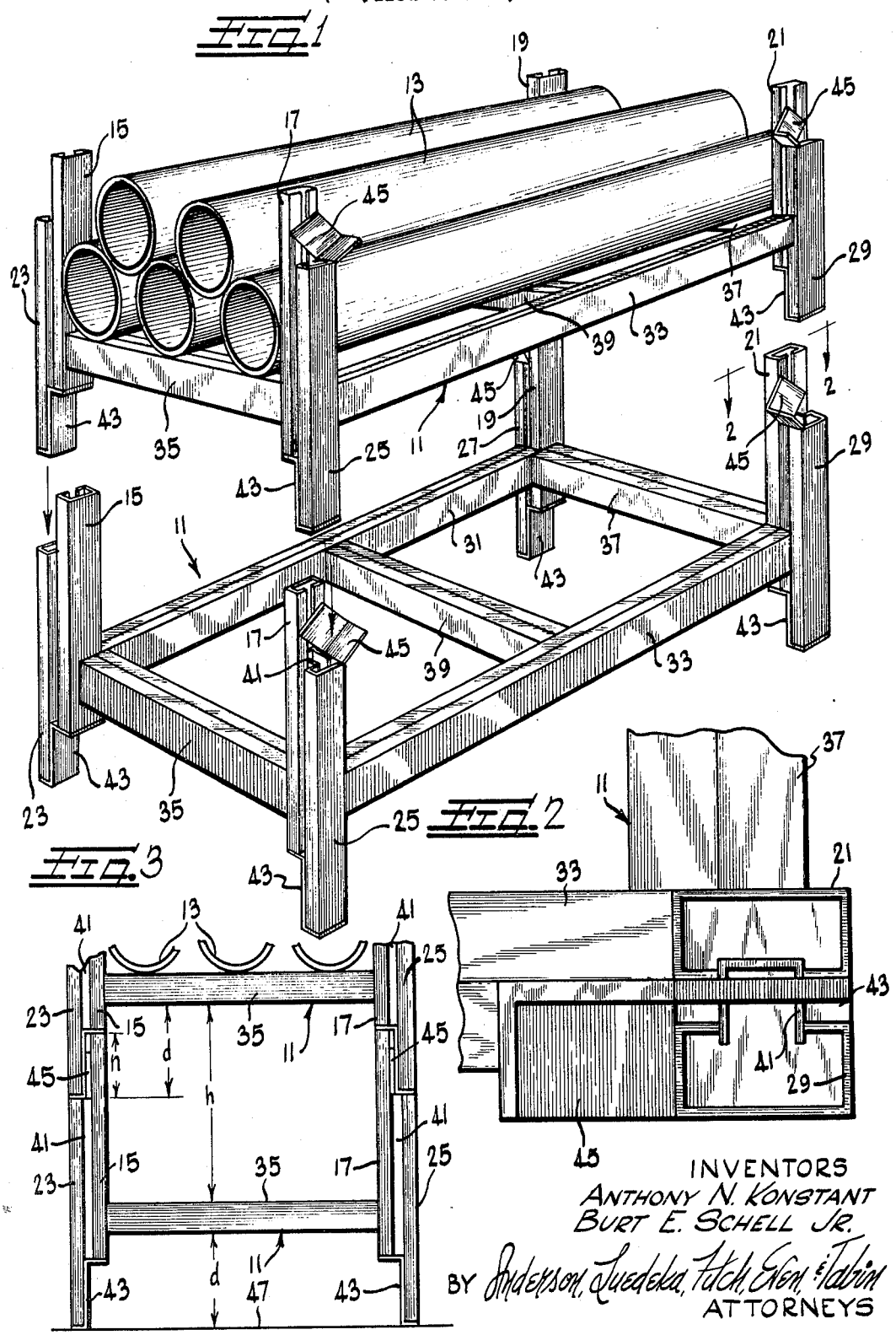

3,502,227
STORAGE RACK
Anthony N. Konstant, Mount Prospect, and Burt E. Schell, Jr., Long Grove, Ill., assignors to Speedrack Inc., Skokie, Ill., a corporation of Illinois
Filed Oct. 18, 1967, Ser. No. 676,139
Int. Cl. A47f 5/10
U.S. Cl. 211—177                    10 Claims

ABSTRACT OF THE DISCLOSURE

A rack structure is described adapted for vertical stacking. A frame is provided with supports, such supports being of a configuration to be able to nest with corresponding supports on an identical rack. The manner in which this is accomplished provides sufficient space under the lowermost rack in a stack to insert a heavy duty platform truck, while avoiding a corresponding loss of space between all racks stacked above the lower rack.

This invention relates to storage devices and, more particularly, to a rack structure adapted for vertical stacking and to a rack assembly comprising a plurality of such rack structures.

Storage racks which may be stacked and unstacked quickly are in prevalent use for storing many different types of items. Such racks afford convenient means of supporting large quantities of stored items while enabling relatively small quantities of such items to be moved when needed. Many racks are designed to support a wide variety of different types of items and are usually made identical for low cost and convenience.

The construction of storage racks which may be stacked one on top of the other usually includes a frame or bed adapted to carry a load thereon and thereby support the stored items. A plurality of supports are normally provided for the frame for one or more reasons. The supports may extend upwardly of the frame to support the immediately adjacent rack so that the load carried by the rack will not be crushed. Alternatively, the supports may extend downwardly of the frame to support the frame a distance above the immediately adjacent rack below for the same reason. The supports may also be designed to provide a certain amount of space between the load and the rack frame above it in order that the fork of a forklift truck or similar type of machine may be inserted underneath the rack for lifting the rack individually. The supports may also be designed to provide a lateral containment for the load, if needed, such as may be required for storing cylinders, tubes, and similar items.

In addition to providing space between the stacked racks for inserting the forks of a forklift truck or similar device, it may be desirable to provide a relatively larger space under the lower rack in order to insert a heavy duty platform truck. This may be desirable in order that entire stacks of racks and the associated stored items may be moved at a single time, or so that individual racks standing on the floor may be moved by a hand-operated type of heavy duty platform truck. To provide sufficient space for heavy duty platform trucks underneath the lowermost rack, if all racks are to be identical for reasons of economy, it is generally necessary to provide a corresponding space between all racks stacked above the lower rack. The amount of such space exceeding that which is needed for the forks of a forklift truck is, of course, usually wasted.

In addition to the problem of providing space for a heavy duty platform truck, some other problems of various types may be encountered in the design of a satisfactory stackable rack. For example, it is desirable that construction of the rack be simple and rugged, low in cost, and have provision for easily aligning the rack being placed on top with the lower rack.

It is therefore an object of the invention to provide an improved stackable rack and an improved rack assembly.

Another object of the invention is to provide a stackable rack which provides for the insertion of a platform truck underneath the lowermost of such racks in a stack while avoiding excessive loss of space between the racks stacked above it.

A further object of the invention is to provide a stackable rack which is simple of construction, low in cost, and has provision for easily aligning the racks when being stacked.

Other objects of the invention will become apparent to those skilled in the art from the following description taken in connection with the accompanying drawings wherein:

FIGURE 1 is a perspective exploded view of a rack assembly incorporating rack structures constructed in accordance with the invention;

FIGURE 2 is a sectional view taken along the line 2—2 of FIGURE 1; and

FIGURE 3 is a partial end view of the rack assembly of FIGURE 1.

Very generally, the rack structure of the invention comprises a frame 11 for carrying a load 13 thereon. A plurality of upper supports 15, 17, 19 and 21 are secured to the corners of the rectangular frame 11 so that they extend a predetermined distance therebelow. A plurality of lower supports 23, 25, 27 and 29 are also secured to the frame. The upper supports are offset from vertical alignment with the lower supports and offset axially upward from the lower supports so that the upper supports may be nested with the lower supports on an identical rack. Because said upper and lower supports are equal in length and are offset axially a distance ("$n$," FIG. 3) greater than the predetermined distance, the frame of the bottom rack in a vertical stack will be spaced from the floor a greater distance ("$d$," FIG. 3) than the distance which the frame of a higher rack in the stack will be spaced above the top of the next lower rack. This arrangement facilitates handling of the racks in their loaded condition by mechanical lift equipment, as explained hereinafter, and stacking of the loaded racks one atop another is facilitated by the provision of angle iron guides 45 which are affixed to the upper supports and serve to guide the ends of the lower supports of a rack into nesting relation atop the upper ends of the lower supports of a rack at the top of a stack. Each guide 45 has a surface disposed at an acute angle to the horizontal which leads downward to a location adjacent an edge of the upper end of the lower support.

Referring now more particularly to the drawing, the frame 11 of each rack is comprised of two longer side members 31 and 33, and two shorter side members 35 and 37. Each of the members 31, 33, 35 and 37 includes a pair of elongated channels of C-shaped cross-sections welded together with their open sides facing each other. The elements of the rack may be made of any suitable materials, such as steel or aluminum. For purpose of illustration, the rack is hereinafter considered to be made of steel.

A cross-member 39, having a construction similar to the other members 31, 33, 35 and 37 of the frame 11, spans the space between the members 31 and 33 at the mid-points thereof, extending parallel with the members 35 and 37. In the illustrated embodiment, the cross-member 39 is welded at its ends to the members 31 and 33.

As may be seen from the drawings, the upper and lower supports are arranged in pairs at the four corners of the periphery of the frame 11. Each of the upper and lower supports is comprised of an elongated channel having a C-shaped cross-section. Of course, other shapes may be used, for example tubular columns. The pairs of upper and lower supports are disposed with their open sides facing each other, in parallel relationship. The supports in each pair are joined together by a connecting channel 41 of U-shaped cross-section. This may be seen best in FIGURE 2, and the connection between the respective pairs of upper and lower supports (the supports 21 and 29, respectively, in FIGURE 2) and the connecting channel 41 is welded. A space or gap is left between the upper and lower supports in each pair. The supports in each pair are secured to the rest of the members of the frame 11 by welding. The supports may be welded directly to the horizontal members or may be indirectly secured thereto, as by interposition of another suitable mounting member.

A bearing plate 43 is secured to the lower ends of each pair of upper and lower supports, preferably by welding. Each plate 43 is comprised of a vertical section which extends alongside the corresponding lower support with which it is associated. Each plate is also comprised of an upper horizontal flange which abuts the lower end of the corresponding upper support and a lower horizontal flange which abuts the lower end of the corresponding lower support. The upper horizontal flange on each plate 43 extends across the gap between the associated upper and lower supports.

When stacking one rack on top of the other, some difficulty may be encountered in achieving alignment. To facilitate alignment of the racks, each of the pairs of upper and lower supports is provided with a guide plate 45 positioned at the top end of each of the lower supports. Each of the guide plates 45 consists of a short segment of channel having an L-shaped cross-section. Each guide plate is disposed at an angle with respect to the vertical and is so disposed as to provide an inclined guiding surface which rises at an angle inwardly toward the pair of upper and lower supports at the opposite end of the frame and on the same side. Thus, an allowance for misalignment of an upper rack with respect to a lower rack is provided which totals about twice the cosine of the angle of the inclined surface from the horizontal times the length of the inclined surface, plus the width of the lower support. By disposing the guide plates to angle inwardly rather than outwardly, interference with adjacent stacks is avoided for a consequent saving of floor space.

Referring now particularly to FIGURE 3, it may be seen that when the lower rack is supported on a floor, indicated at 47, a clearance between the floor and the lower edge of the frame is provided indicated by the distance $d$. This distance is made sufficient to accommodate conventional heavy duty platform trucks in order that stacks of the platforms may be moved. Above the lower rack, the distance $h-(d-n)$ is available for storage. The distance $d-n$ is made sufficient to accommodate the fork of a conventional forklift truck for picking single racks off the top of the stack and moving them individually. This distance $d-n$ is all the vacant space that need exist between the stacked racks above the lower rack. The distance $n$ represents that distance saved by the nesting action of the vertical supports. This is accomplished by the offsetting of the supports from vertical alignment, and by the axial offsetting of the upper and lower supports in each pair. In other words, the axial offset distance $n$ in each pair is that additional distance needed to accommodate a heavy duty platform truck over the distance needed to accommodate the fork of a forklift truck $(d-n)$.

Although the specific construction described affords particular advantages in economical and rugged construction, other configurations are possible. For example, the upper and lower supports in each pair may be integral or unitary pieces rather than a welded assembly. As a further example, the upper and lower supports may be axially aligned cylinders of diameters different enough to be vertically offset and permit a telescoping action. The frame need not be joined to the supports between their ends, as illustrated, but may be at or near the top ends of the support pairs with some configurations.

It may therefore be seen that the invention provides an improved rack structure and an improved rack assembly comprising such rack structures. Provision is made for insertion of a heavy duty platform type truck beneath the lowermost rack in a stack, while effecting a substantial saving in wasted space in the upper racks of the stack. All this is accomplished while providing a rack structure which is simple of construction, low in cost, and which has provision for easily aligning the racks during stacking.

Various modifications of the invention in addition to those shown and described herein will become apparent to those skilled in the art from the foregoing description and accompanying drawings.

What is claimed is:

1. A rack structure adapted to permit vertical stacking with a similar rack structure comprising a horizontal frame for carrying a load thereon and four corner supports secured to said frame, each of said corner supports including an upper support member and a lower support member, said upper support member of each corner support being parallel to and inwardly offset from vertical alignment with said lower support member thereof in a manner so that said lower support members of two adjacent corners flank said upper support members thereof, said corner supports being connected to said horizontal frame at a location where the lower ends of said upper support members extend a predetermined distance below said frame, said upper support members being partially offset axially upward from said lower support members a distance substantially greater than said predetermined distance, and said corner supports being designed to nest with the corner supports of a similar rack structure stacked vertically thereatop with the upper portions of said upper support members lying generally adjacent and inward of the lower portions of the lower support members of the overlying rack structure whereby said rack structures when loaded are adapted for movement either singly or as a stack of mechanical handling equipment.

2. A rack structure in accordance with claim 1 wherein said upper and lower support members are of equal length so that the upper ends of both said upper and lower support members abut the lower ends of said upper and lower support members, respectively, of an overlying stacked rack.

3. A rack structure in accordance with claim 1 wherein said horizontal frame is rectangular in shape and wherein said upper and lower support members are vertically offset in a direction along the shorter sides of said rectangle.

4. A rack structure in accordance with claim 1 wherein said parallel upper and lower support members are spaced apart from each other and wherein guide means is attached to each of said upper support members, which guide means has a guide surface disposed at an acute angle to the horizontal which guide surface is out of axial alignment with said corner support and extends downward to a location adjacent the upper end of said lower support member.

5. A rack structure adapted to permit vertical stacking with a similar rack structure comprising a horizontal frame for carrying a load thereon, four corner supports secured to said frame, each of said corner supports including an upper support member and a lower support member, said upper support member of each corner support being parallel to and offset from vertical alignment with said lower support member thereof, said corner supports being connected to said horizontal frame at a location where the lower ends of said upper support members extend a predetermined distance below said frame, said upper support members being partially offset axially upward from said lower support members, said corner supports being designed to nest with the corner supports of a similar rack structure stacked vertically thereatop with the upper portions of said upper support members lying generally adjacent the lower portions of the lower support members of the overlying rack structure, and guide means attached to each of said corner supports and having a guide surface at an acute angle to the horizontal which guide surface is out of axial alignment with said corner support and extends downward to a location adjacent the upper end of said lower support member.

6. A rack structure in accordance with claim 5 wherein said parallel upper and lower support members are rectangular in cross section and are horizontally spaced apart from each other, and wherein said guide means is a piece of angle iron, one flange of which is affixed to said upper support member along the side facing said lower support member, said spacing of said support members being greater than the thickness of said angle iron.

7. A rack structure in accordance with claim 6 wherein said horizontal frame is rectangular in shape and wherein said upper and lower support members are vertically offset in a direction along the shorter sides of said frame rectangle, and wherein said guide means lie along the longer sides of said rectangle with said guide surfaces being disposed inwardly of said corner supports.

8. A rack structure in accordance with claim 7 wherein said upper and lower support members are of equal length so that the upper ends of both said upper and lower support members abut the lower ends of said upper and lower support members, respectively, of an overlying stacked rack.

9. A rack structure in accordance with claim 6 wherein said upper and lower support members are of channel-like construction with the open sides facing each other and wherein said support members are spaced apart by an axially extending element affixed therebetween at the vertical level where said upper and lower support members axially overlap.

10. A rack structure in accordance with claim 9 wherein said support members are C-shaped channels having inturned flanges and wherein said element is a channel, the flanges of which are welded to the edges of said inturned flanges.

References Cited

UNITED STATES PATENTS

| | | | |
|---|---|---|---|
| 324,485 | 8/1885 | Place | 217—45 |
| 718,402 | 1/1903 | Tufts | 217—45 |
| 2,676,776 | 4/1954 | Townson | 108—53 |
| 2,801,752 | 8/1957 | Jakubowski | 211—49 |
| 3,136,425 | 6/1964 | Greenburg | 211—182 |

DAVID J. WILLIAMOWSKY, Primary Examiner

WAYNE L. SHEDD, Assistant Examiner

U.S. Cl. X.R.
211—126; 214—10.5